United States Patent [19]

Townsend et al.

[11] 4,187,583
[45] Feb. 12, 1980

[54] METHOD AND MEANS FOR ENCASING SAUSAGE OR THE LIKE

[75] Inventors: Ray T. Townsend; David W. Smith, both of Des Moines, Iowa

[73] Assignee: Townsend Engineering Company, Des Moines, Iowa

[21] Appl. No.: 939,786

[22] Filed: Sep. 5, 1978

Related U.S. Application Data

[63] Continuation of Ser. No. 730,669, Oct. 7, 1976, abandoned.

[51] Int. Cl.² .................. A22C 11/10; A22C 11/02
[52] U.S. Cl. ..................................... 17/49; 17/1 F; 17/33
[58] Field of Search .................. 17/41, 40, 42, 33, 35, 17/49

[56] References Cited

U.S. PATENT DOCUMENTS

| | | | |
|---|---|---|---|
| 2,572,917 | 10/1951 | Ell | 17/40 |
| 3,694,853 | 10/1972 | Greider | 17/33 |
| 3,731,346 | 5/1973 | Kupcikevicius | 17/49 |
| 3,975,797 | 8/1976 | Kupcikevicius | 17/41 |

Primary Examiner—Willie G. Abercrombie
Attorney, Agent, or Firm—Zarley, McKee, Thomte, Voorhees & Sease

[57] ABSTRACT

The product encasing machine includes a rotatable stuffing tube having a folded casing mounted thereon. The product is pumped or moved through the interior of the stuffing tube into the casing. A restrictor apparatus is secured to the stuffing tube and is positioned within the casing being filled downstream of the discharge end of the stuffing tube to spread and increase the pressure in the stuffed casing. The rotating restrictor applies torque to the sausage from the inside of the casing to impart torque thereto and causes a rotational drive to the product so that a link is formed by the twisting of the casing.

7 Claims, 3 Drawing Figures

METHOD AND MEANS FOR ENCASING SAUSAGE OR THE LIKE

This is a continuation application of co-pending application Ser. No. 730,669 filed Oct. 7, 1976, now abandoned.

BACKGROUND OF THE INVENTION

In sausage linking machines, the sausage is comprised of a mixture or an emulsion which is not a liquid or a solid but rather a semi-liquid. The emulsion has a high viscosity and resists sudden changes in form or shape.

In conventional linking machines, a sheared or folded casing is placed on the horn or stuffing tube of some form of stuffer and the sausage emulsion is extruded from the horn into the casing to fill the casing. The pressure to which the casing is filled depends on the amount of drag which is applied to the casing at the end of the horn to retard the flow of the casing. The applied drag may be in the form of the operator's fingers slightly pinching the casing against the end of the horn or it may be in the form of a chuck apparatus. In all cases, drag is applied to the casing and the amount of drag will influence the amount of pressure which is built up in the filled casing. In other words, the flow of the emulsion is balanced against the flow of the casing to achieve the desired tightness in the stuffed casing.

There may be additional factors which influence the flow of the casing, and in turn the pressure, such as in some machines which use a linking chain to pace the flow of the casing but the drag from the chuck is necessary to build up enough pressure in the casing to give it strength enough to enable the linking chain to support the same. In all cases, the flow of the casing is controlled by applying a retarding force to the outside of the casing which, in turn, controls the pressure to which the casing is stuffed. One of the difficulties in using drag on the casing to influence pressure is that the drag causes considerable tension in the delicate casing, and when the casing is collapsed and twisted for linking, the casing may be stressed beyond its maximum limit and break.

Additionally, the inertia of the emulsion as it is being extruded from the stuffing tube must be overcome to slow the emulsion down to the speed of the casing and such inertial force creates an additional strain on the casing.

In linking machines which twist the casings to link the same, the rotational drive is applied to the casing from outside the casing in one manner or another. Frequently, the fragile casing will break due to the rotational torque being applied to the casing to form the link.

Therefore, it is a principal object of the invention to provide an encasing apparatus wherein a restrictor means is positioned within the emulsion downstream of the discharge end of the stuffing tube.

A still further object of the invention is to provide a restrictor means for an encasing machine which spreads and increases the pressure of the emulsion within the casing.

A still further object of the invention is to provide a method and means for imparting rotational torque or drive to the casing from within the casing.

A still further object of the invention is to provide an encasing machine including a restrictor means which reduces the speed of flow of emulsion from the discharge end of the stuffing tube to reduce casing strain.

A further object of the invention is to provide an encasing apparatus including a restrictor means positioned downstream of the discharge end of the stuffing tube which causes the casing being filled to move against the face of the rotating chuck.

A still further object of the invention is to provide a method and means for encasing a product such as sausage or the like which is efficient.

These and other objects will be apparent to those skilled in the art.

SUMMARY OF THE INVENTION

Figure 1:
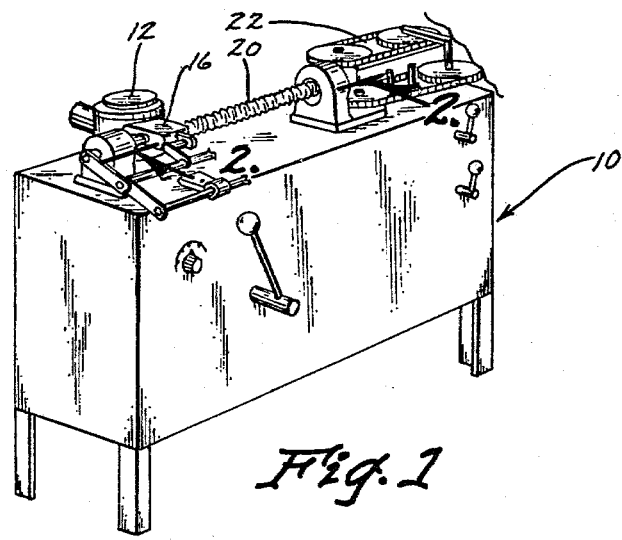
FIG. 1 is a perspective view of a product encasing machine having the device of this invention mounted thereon.

The product encasing machine includes a rotatable stuffing tube having a folded casing mounted thereon which passes through a rotatable chuck. The product is pumped or forced through the stuffing tube and outwardly through the discharge end thereof to fill the casing passing from the end of the discharge tube. A restrictor means is positioned within the casing downstream from the discharge end of the stuffing tube in the flow of the product and spreads the product and increases the pressure of the product within the casing. One form of the restrictor is "bullet" shaped while another form of the restrictor is coil shaped. The restrictor also causes the product to move the casing outwardly against the face of the chuck to hold the casing in contact with the chuck flutes. The restrictor also imparts rotational torque to the casing.

DESCRIPTION OF THE PREFERRED EMBODIMENT

The numeral 10 generally designates an apparatus for encasing a product so as to produce sausages, franks and the like. Apparatus 10 is fully disclosed in U.S. Pat. No. 3,694,853 and generally includes a product pump 12 adapted to pump products of plastic consistency. A connecting conduit 14 connects pump 12 to a spindle housing 16 having an elongated stuffing tube 18 extending therefrom. The meat product is pumped into the casing 20 mounted on the stuffing tube 18 and passed through the linking apparatus generally designated by the reference numeral 22. The numeral 24 refers generally to a rotational chuck having a plurality of longitudinally extending flutes 26 provided thereon which are adapted to engage the casing 20 as illustrated to impart rotational movement thereto. Stuffing tube 18 is preferably of the conventional rotating type. All of the apparatus described hereinabove is of conventional design and it is to this apparatus that the restrictor means of this invention is mounted. One form of the restrictor means is illustrated in FIG. 2 and is generally designated by the reference numeral 28 while the modified form of the restrictor means is illustrated in FIG. 3 and is designated by the reference numeral 30.

Figure 2:
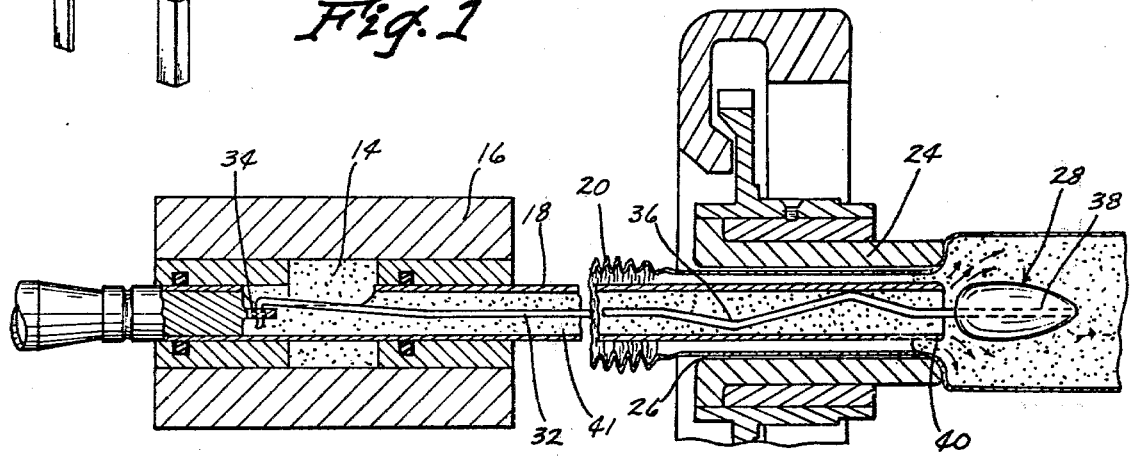
FIG. 2 is an enlarged partial sectional view seen on lines 2—2 of FIG. 1.

Referring to FIG. 2, restrictor means 28 comprises an elongated support member 32 preferably comprised of spring wire or the like. One end of support member 32 is connected to the stuffing tube at 34 as illustrated so that rotational movement of the stuffing tube will be imparted to the support member 32. As seen in FIG. 2, support member 32 is provided with several bends 36 formed therein which are provided to cause the support member 32 to be in frictional engagement with the interior of the stuffing tube 18 to insure that the support member 32 will in fact rotate with stuffing tube 18. Restrictor element 38 is secured to the downstream end of the support member 32 and is of the "bullet" or teardrop shape seen in the drawings. It can be seen in FIG. 2 that the restrictor element 38 is positioned closely adjacent the discharge end 40 of stuffing tube 18 so as to be in the flow path of the meat product being discharged therefrom which is referred to generally by the reference numeral 41.

Figure 3:
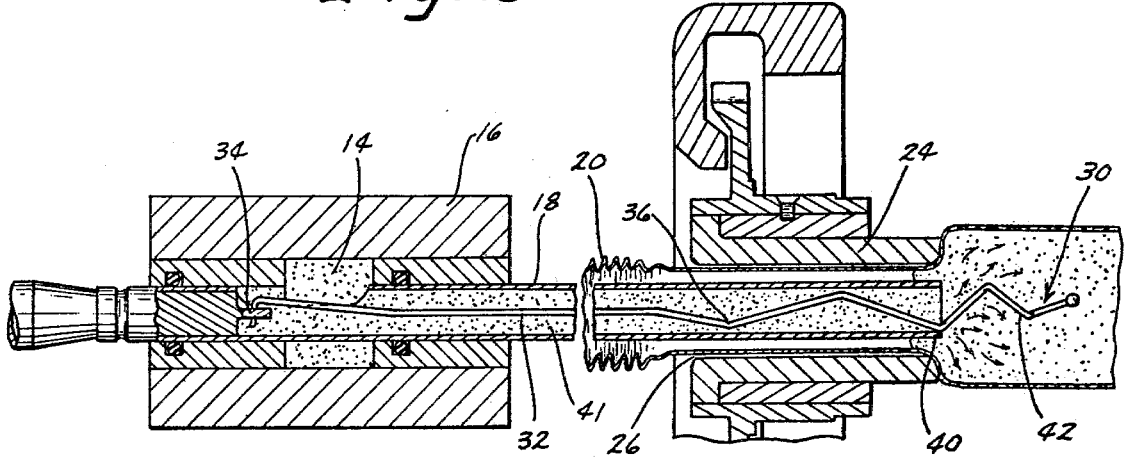
FIG. 3 is a view similar to FIG. 2 except that a modified form of the restrictor is illustrated.

FIG. 3 illustrates a modified form of the restrictor means which is generally similar to that of FIG. 2 except that the configurations of the restrictor element 42 in FIG. 3 is of the coil type as opposed to the configuration illustrated in FIG. 2. The restrictor elements 38 and 42 function in the same manner and the description of the operation of the restrictor element will be limited to the embodiment of FIG. 2.

As the meat product 41 is being pumped from the discharge end of the stuffing tube 18, the restrictor element 38 acts as a spreader or obstruction to cause the meat product to fill the casing to the desired pressure with much less drag being created on the casing. It is believed that the restrictor element 38 acts in three ways to perform its function. First, because the product is very viscous and tends to retain its shape, the column of emulsion being extruded from the stuffing tube tends to continue in a small diameter column essentially the same size as the stuffing tube and considerable drag on the casing would be required to deform the column to cause it to spread to the sides of the casing. The restrictor element 38 works directly on the column of emulsion to deform the emulsion so that that portion of the drag is eliminated from the casing.

Secondly, the inertia of the product being extruded from the stuffing tube must be overcome to slow the emulsion to the speed of the casing. The restrictor element 38 slows the flow of emulsion without adding any strain to the casing.

Thirdly, as the emulsion is extruded from the stuffing tube, the emulsion builds up in the casing and causes the casing to be pulled from the stuffing tube. Except for the inertial force explained hereinabove, the extruding force, or propelling force for stripping the casing from the stuffing tube would appear to be the pressure per square inch developed in the filled casing times the area of the horn. Thus, if the area of the filled casing is one square inch and the area of the horn is one half square inch, then the propelling force would be one half square inch times the pressure per square inch in the casing. This would be the amount of force propelling the casing and it would also be the amount of drag which would be needed to cause the mentioned pressure in the casing. However, if the restrictor 38 is positioned as described to restrict the flow of the material, then the area of the restrictor must be subtracted from the area of the stuffing tube to get the effective area which is propelling the casing. In other words, it appears that the restrictor counteracts the area of the horn to reduce the propelling force that is moving the casing. However, as the restrictor counteracts the force of the stuffing tube, the casing is filled to its larger diameter and the emulsion tends to spread in both directions forward and backward. As the emulsion spreads backwards, it exerts a force against the face of the chuck through which the casing is moving. The face area of the chuck acts as a reaction against which emulsion can push to carry the casing along.

The restrictor element also has another important aspect to be considered. In all linking machines which link the casing by twisting the same, the rotational drive is applied to the casing from outside of the casing. In the disclosed apparatus, the chuck is provided with flutes, and as the casing is progressing through the chuck, the flutes hook into the surface of the casing and cause rotation. The rotating restrictor element applies torque to the emulsion itself and greatly reduces the amount of torque which must be applied to the exterior of the casing to achieve the rotation of the casing and the emulsion. The rotational torque applied to the emulsion permits links to be formed in the casing by twisting without the necessity of undesirable exterior forces being applied to the casing as in previous machines.

The preferred and best mode of the invention has been disclosed. A restrictor element (38 or 42) would still have functional merit if used with a stationary tube 18. Further, the restrictor element 38 could successfully perform if it were rotatably mounted on the end of 32 even if member 32 were rigidly mounted. In addition, the restrictor elements could also successfully function if they were mounted exteriorally of tube 18 other than by support members 32.

Thus it can be seen that a novel method and means of encasing a product has been described which achieves all of its stated objectives.

We claim:

1. The method of creating a link in a meat product being extruded from the discharge end of a stuffing tube into a casing comprising the steps of:
   extruding a quantity of meat product from the discharge end of a stuffing tube into an elongated casing,
   applying at least some rotational torque to the meat product from within the extruded meat product at an exterior location beyond the discharge end of said stuffing tube whereby the meat product and casing will have rotational torque applied thereto to form a link.

2. The method of claim 1 comprising the further step of rotating said stuffing tube.

3. In combination,
   an emulsion encasing apparatus including a stuffing tube having a discharge end, said stuffing tube adapted to have a folded casing positioned thereon,
   a restrictor means mounted on said apparatus and having a restrictor element comprising an elongated wire coil extending outwardly from the discharge end of said stuffing tube, said elongated wire coil being adapted to deform a column of emulsion extruded from the discharge end of said stuffing tube at an exterior location beyond said discharge end, and to impart rotational torque to such extruded emulsion and to the casing engaged by such extruded emulsion.

4. The combination of claim 3 wherein said stuffing tube is rotatably mounted on said apparatus.

5. The combination of claim 3 wherein said elongated wire coil has an elongated portion that extends longitudinally through the substantial length of said stuffing tube.

6. The combination of claim 3 wherein the end of said elongated portion of said elongated wire coil is connected to said stuffing tube at the end of said stuffing tube opposite to said discharge end thereof.

7. In combination,
an emulsion encasing apparatus including a stuffing tube having a discharge end, said stuffing tube adapted to have a folded casing positioned thereon,
a restrictor means mounted on said apparatus and having a restrictor element comprising a meat emulsion rotating means extending outwardly from the discharge end of said stuffing tube, said meat emulsion rotating means being adapted to deform a column of emulsion extruded from the discharge end of said stuffing tube at an exterior location beyond said discharge end, and to impart rotational torque to such extruded emulsion from within said extruded emulsion and to the casing engaged by such extruded emulsion.

* * * * *